Nov. 10, 1959  J. MATTERN ET AL  2,912,034
VEHICLE WHEEL WITH ELASTIC INTERMEDIATE
MEMBERS BETWEEN RIM AND HUB
Filed March 20, 1956  2 Sheets-Sheet 1

INVENTORS
JOHANNES MATTERN
PAUL HENSS
BY
ATTORNEY.

INVENTORS
JOHANNES MATTERN
PAUL HENSS

BY

ATTORNEY

United States Patent Office 2,912,034
Patented Nov. 10, 1959

2,912,034

VEHICLE WHEEL WITH ELASTIC INTERMEDIATE MEMBERS BETWEEN RIM AND HUB

Johannes Mattern, Northeim, Hannover, and Paul Henss, Einbeck, Germany

Application March 20, 1956, Serial No. 572,729

Claims priority, application Germany March 23, 1955

5 Claims. (Cl. 152—49)

The present invention relates to a flexible vehicle wheel with elastic intermediate members between wheel hub and wheel rim.

Cushioning means for wheels are already known in form of flexible spokes or rubber bands which replace the spokes. It has also already been proposed to use rubber rings which are vulcanized between two wheel disks and which, on their outer circumference, support the wheel rim.

All of the flexible wheel designs known hitherto have, however, many deficiencies. On the one hand, a complicated structure of the wheel is necessary and on the other hand, loads which result when driving, particularly the braking forces, are absorbed incompletely only. In known wheel arrangements the resilient action could not be adjusted so that the elastic means, after a certain operating period, became unserviceable due to fatigue, and the complete wheel had to be replaced.

It is, therefore, one object of the present invention to provide a vehicle wheel with elastic intermediate members, which eliminates the deficiencies of the known flexible vehicle wheels by providing two cup-shaped hollow rubber bodies on the wheel hub, which bodies bear with their open rims against a plate supporting the wheel rim, and which in axial direction are braced relative to each other. Preferably, the hollow rubber bodies are reinforced in the zone of the hub and taper down towards their rims, so that they bear against the intermediate plate which supports the rim, with great adherence.

It is another object of the present invention to provide a vehicle wheel with elastic intermediate members, wherein around the rim of the hollow rubber bodies the plate fixed to the wheel rim is also provided with abutments, stops or annular skirts into which the rims of the hollow rubber bodies are forced when compressed axially. To ensure complete absorption of the braking force and, respectively, to prevent the wheel rim and the wheel hub from rotating relative to each other, the abutments or, respectively, the skirt receiving the rim of the hollow rubber body may be provided with retaining means or the like. Furthermore, the hollow rubber bodies, in their outer part, are passed through by bolts ensuring connection of the hollow rubber bodies with the wheel hub. These bolts are adjustable to vary the compression of the hollow rubber bodies against each other. On the other hand, there is the possibility to fix the hollow rubber bodies on the hub, independent from each other.

It is yet another object of the present invention to provide a vehicle wheel with elastic intermediate members, wherein due to the novel design of the vehicle wheel and, respectively, by using cup-shaped hollow rubber bodies, the center part of the wheel is completely smooth and closed, so that dirt or foreign matter cannot penetrate between the elastic means. On the other hand, however, the elastic means can be adjusted at will. By tightening the bolts passing through the hollow rubber bodies, pressure of the rubber material against the plate supporting the wheel rim is increased so that in this manner the stiffness of the elastic means is adjustable as might be necessary. On the other hand, both hollow rubber bodies are replaceable so that at any time it is possible to replace the cup-shaped parts for other material.

It is also another object of the present invention to provide a vehicle wheel with elastic intermediate members, wherein the outer rims of the cup-shaped hollow bodies can be vulcanized on the retainer ring or on the disk supporting the wheel rim, in order to be sure that in any case the load acting in circumferential directions on the wheel is absorbed by the elastic means. Nevertheless, the possibility of axial compression and variation of the flexible action is maintained.

With these and other objects in view, which will become apparent in the following detailed description, the present invention will be clearly understood in connection with the accompanying drawings, in which.

Figure 1:
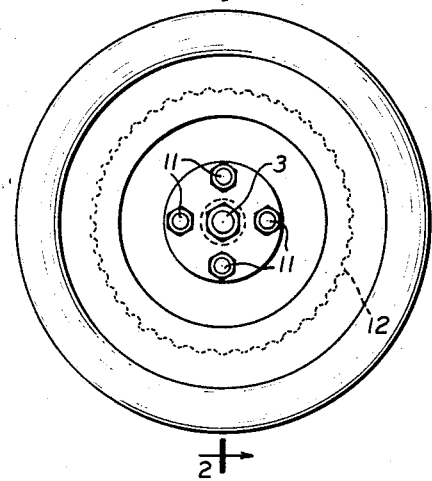
Figure 1 is a front elevation of the wheel.
Figure 2:
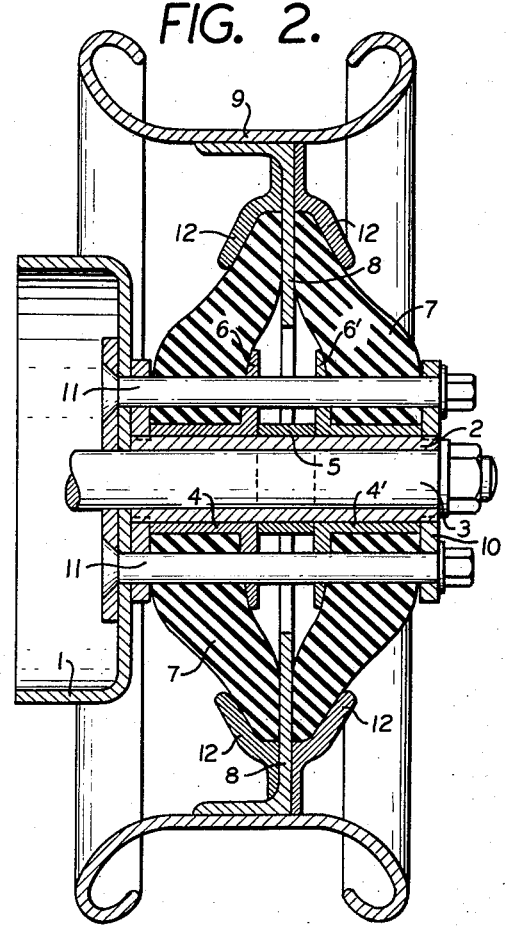
Fig. 2 is an axial section of the wheel along the lines 2—2 of Fig. 1.

Referring now to the drawings, and in particular to the embodiment of the wheel shown in Figs. 1 and 2, the brake drum 1 is provided with a hub 2 which is placed on the axle 3. Bushings 4 and 4' are placed on the hub 2 by interposing an intermediate ring 5, the bushings 4 and 4' having a face 6 and 6', respectively, radially extending outwardly. A hollow rubber body 7 or 7' (Figs. 3 and 4) is fitted on the bushings 4 and 4', respectively, both of the hollow rubber bodies 7 or 7' facing each other with their open rims and bearing against a flat, annular disk 8 which on its outer surface supports the rim 9.

In axial direction the hollow rubber bodies 7 or 7' facing each other are pressed against each other by fitting a locking ring 10 on the hub 2, or it is possible to use the bolts 11 which pass through the wheel body, for such pressing action. It is to be understood that the wheel may also be designed in such manner that the wheel with its hub can be taken off the axle without the necessity to loosen the axial compressing action on the hollow rubber bodies 7 and 7'.

It is important that abutment members 12 are arranged on the circumference of the hollow rubber body on the disk 8 supporting the wheel rim 9, into which abutment members the rims of the hollow rubber bodies 7 are pressed. As shown in Fig. 1, the abutment member 12 may form rings having notches or other retaining means on their inside, so that when compressing the hollow rubber bodies 7, the rims of the latter enter into these notches, whereby it is ensured that they are taken along in circumferential direction.

Figure 5:
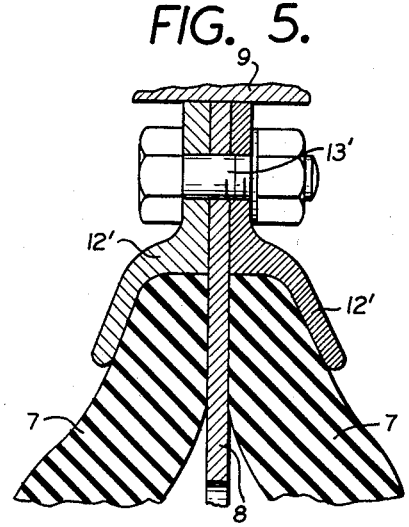
Figs. 5 and 6 are fragmentary sections of other embodiments of the wheel.

In the embodiment illustrated in Fig. 5, the rings 12' are separate parts which afterwards are connected with the disk 8 through means of bolts 13'. These rings 12' may also be vulcanized on the circumference of the hollow rubber bodies 7, or an arrangement may be made in which the rims of the hollow rubber bodies 7 are vulcanized to the disk 8. If necessary, bolts or the like may be used which pass through the projecting rims of the rings 12' and the rims of the hollow rubber bodies 7 embedded therein.

Figure 6:
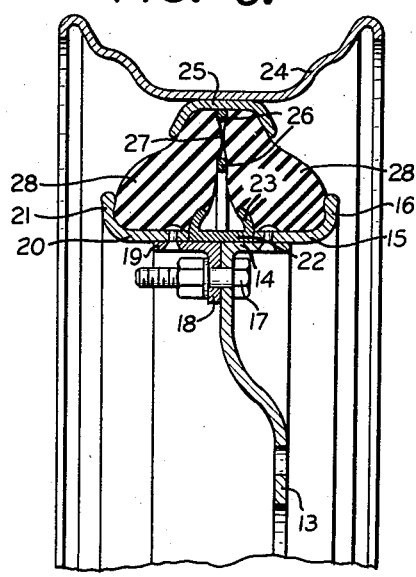
Figure 7:
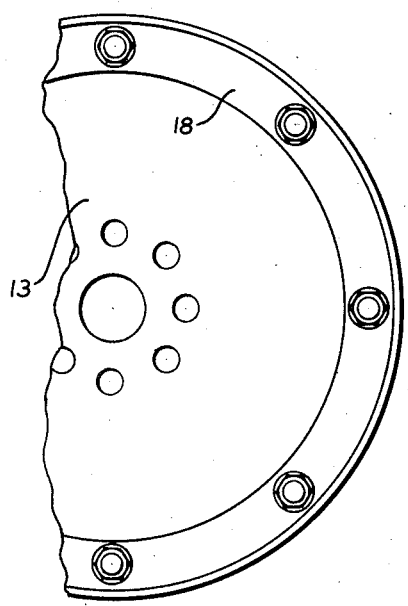
Fig. 7 is a schematic front elevation of the wheel shown in Fig. 6.

In the embodiment of the wheel disclosed in Figs. 6 and 7, the elastic intermediate member between the axle and the rim has been arranged more towards the outside. A wheel body 13 is used which is fixed on the axle or the brake drum of the vehicle in the usual manner. On its circumference the wheel body 13 is provided with an annular cylindrical collar 14 which, after forming a step-like section, passes into a cylinder 15 which on its outside has a bent-over reinforced rim 16.

In the immediate proximity of the collar 14 bores are provided around the circumference of the wheel body 13 for the fixing bolts 17 through means of which a ring 18 is secured to the wheel body 13, said ring also having a collar 19 and a cylinder 20 with a bent-over rim 21. The collar 19 is of the same diameter as the collar 14 and together with an annular intermediate member 22 serves to center the complete unit. The intermediate ring 22 has rims 23 which are bent-over towards the outside.

In its center the rim 24 is provided with an abutment member 25 and a plate 26 which radially extends to the inside and has bores 27 on its circumference.

Figure 8:
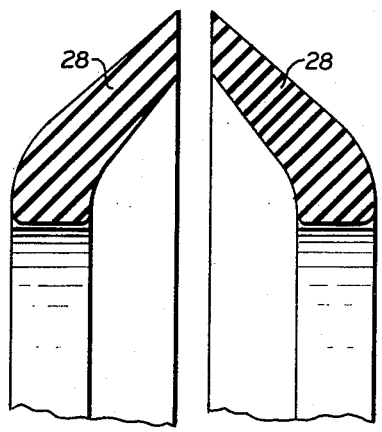

Hollow rubber bodies 28 are placed between the rim 24 or, respectively, its annular abutment member 25 and the cylinders 15 and 20, respectively. Normally, the hollow rubber bodies 28 are of a cone-like shape and, with their outer rim, bear against the abutment member 25 and the plate 26, respectively. By tightening the bolts 17, the hollow rubber bodies are stressed so that they are forced into the recesses 27 of the plate 26 under considerable pressure. Only after having been pre-stressed in such manner both hollow rubber bodies 28 receive the shape shown in Fig. 6. Their normal shape is disclosed in Fig. 8. Contrary to the hollow rubber bodies 7 and 7', illustrated in Figs. 3 and 4, in this case, rubber rings 28 are employed, which are adapted to the wheel dimensions.

To prevent the rubber bodies 28 from turning relative to their base, abutments, teeth, notches, or the like may be provided between the abutment member 25 and the rubber body 28, as well as between the cylinders 15 or 20 and the hollow rubber bodies 28. The cylinders 15, for example, may have external teeth on their circumference, and the abutment member 25 may be internally toothed on its pressing surface so that when subjecting the hollow rubber bodies 28 to stress they are pressed into said teeth.

By placing shims between the wheel body 13 and the ring 18, compression or, respectively, pre-stress of the hollow rubber bodies 28 can be controlled.

Figure 3:
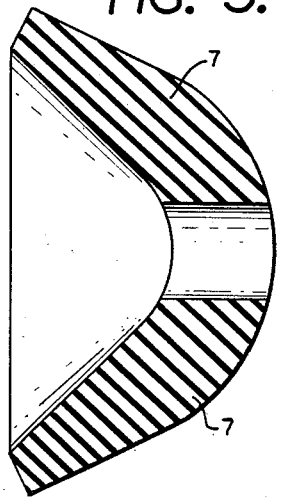
Figs. 3, 4 and 8 are sectional views of different embodiments of the cup-shaped hollow rubber bodies.
Figure 4:
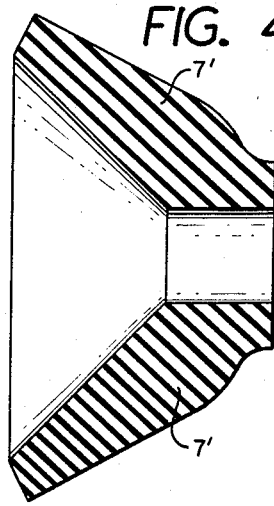

The hollow rubber bodies used may be of a shape adapted to the resulting loads. They will be thicker near the hub than at their rims. Figs. 3 and 4 illustrate two embodiments only. Inside the hollow rubber bodies 7 or 7' may be incorporated a fabric reinforcement (not shown). The hardness the material used depends upon the elasticity desired. Instead of rubber, other suitable resilient material, plastics in particular, may be used.

While we have disclosed several embodiments of the present invention, it is to be understood that these embodiments are given by example only and not in a limiting sense, the scope of the present invention being determined by the objects and the claims.

We claim:

1. A flexible vehicle wheel having an axle and comprising a wheel disk supporting a rim at its periphery, a hub including two bushings, the latter having flanges extending radially in outward direction, said bushings defining annular chambers axially spaced apart from each other, an intermediate ring member disposed on said hub between said bushings spacing apart the latter, means maintaining said bushings in a selected position axially immovable on said hub, two elastic, intermediate circular members disposed between said hub and said rim and bearing with their oppositely disposed faces adjacent their outer ends against said wheel disk, abutment members mounted on said rim and receiving the respective outer ends of said elastic intermediate circular members, the inner ends of the latter being received in said chambers of said bushings, said elastic intermediate circular members consisting of two cup-shaped rubber bodies reinforced adjacent said hub and tapered down towards said rim and exerting radial pressure towards said bushings and said hub, respectively, thereby eliminating any clamping means for connection of said rubber bodies with said hub and said rim, respectively.

2. The flexible vehicle wheel, as set forth in claim 1, which includes additional abutment means arranged on said wheel disc around the circumference of said rubber bodies, and the rims of said rubber bodies bearing against said abutment means.

3. The flexible vehicle wheel, as set forth in claim 2, wherein said abutment means enclosing the rim of said rubber bodies are provided with retaining means which prevent the wheel rim from twisting relative to said rubber bodies and their rims.

4. The flexible vehicle wheel, as set forth in claim 2, wherein said abutment means enclosing said rubber bodies at their rims are fixedly secured to said wheel disc.

5. The flexible vehicle wheel, as set forth in claim 2, wherein said abutment means enclosing the rims of said rubber bodies are vulcanized to said rubber bodies and secured to said wheel disc by releasable means.

References Cited in the file of this patent

UNITED STATES PATENTS

| | | |
|---|---|---|
| 1,071,953 | Picard | Sept. 2, 1913 |
| 1,588,480 | Lord | June 15, 1926 |
| 1,684,596 | Patch | Sept. 18, 1928 |
| 2,491,698 | Walden | Dec. 20, 1949 |